Jan. 30, 1934.  W. McQUADE  1,945,004
METHOD OF MAKING A STRUCTURAL UNIT
Filed April 11, 1932
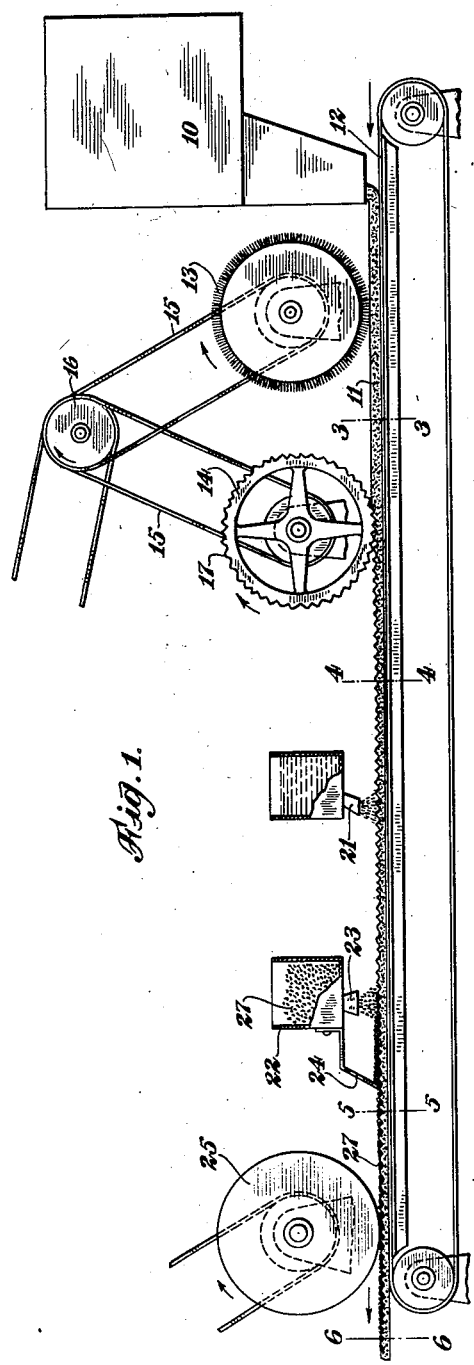
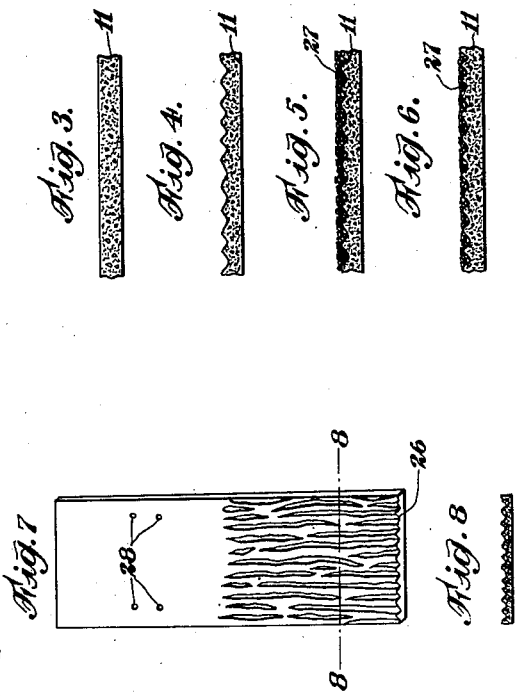
INVENTOR
Walter McQuade
BY D. N. Halstead
ATTORNEY Patented Jan. 30, 1934

1,945,004

UNITED STATES PATENT OFFICE 1,945,004

METHOD OF MAKING A STRUCTURAL UNIT

Walter McQuade, Port Washington, N. Y., assignor to Johns-Manville Corporation, New York, N. Y., a corporation of New York Application April 11, 1932. Serial No. 604,532

17 Claims. (Cl. 18—48)

This invention relates to a method of making a unit of structural material of uneven surface, particularly a rigid shingle with an irregularly corrugated surface. The invention pertains especially to making such shingles from a composition, such as one containing a hydraulic cementitious material and asbestos fibers, that is plastic or readily deformable at one stage of the process of manufacturing the shingles.

The invention provides a means of making elevations and depressions forming ornamental contours in the surface of mixed raw materials while in the readily deformable state and protecting these irregularities against substantial deformation or obliteration during subsequent treatment. A typical procedure involves forming the irregularities or depressions in a surface of the material, covering them with a filler material that is removable without change of state, then densifying and hardening the material, and removing the filling material, subsequent to the hardening.

Rigid shingles prepared from a mixture of Portland cement and asbestos fibers, either in presses or by machine of a type and a process similar to that described in U. S. Patent 979,548 to Norton, dated December 27, 1910, are illustrative of the products and materials to which the invention has been successfully applied, and the invention is specifically described hereinafter with reference to such products. Such shingles may contain various proportions of Portland cement to short asbestos fibers, as, for example, 1.7 to 2.2, suitably 1.9, parts by weight of the cement to 1 part of asbestos. Also, the shingles may contain admixed coloring material, such as lamp black, for example, and/or a veneer of coloring materials, such as pigments, adhered to a face of the shingle by means of a cementitious material. Thus a veneer of Portland cement and burnt umber, chrome green, yellow oxide, and/or the like, may be applied to the top surface of a band or sheet of the mixture of the other shingle ingredients, wetted with a spray of water, and firmly adhered to the said band or sheet, as by subsequent pressing and hardening operations. Further, a surface coating of colored material, such as granulated colored slate or tile, may be sprinkled over the top surface and welded thereto by subsequent pressing and hardening.

My improved products, as well as a method of producing them, are illustrated in the accompanying drawing in which Fig. 1 illustrates diagrammatically an assembly of an apparatus suitable for use in the manufacture of the products of the invention.

Fig. 2 is a perspective view of the rotary die provided with a molding surface adapted to impart an irregular surface to the readily deformable mixture of Portland cement and asbestos fibers.

Figs. 3 to 6 inclusive are end views of segments of the sheet material as it travels along the conveyor and illustrate the condition of the sheet obtaining at the stages indicated by the positions of the several lines 3—3, 4—4, etc., on Fig. 1.

Figs. 7 and 8 are a perspective and a sectional view on line 8—8, of Fig. 7, respectively, of a shingle made in accordance with the invention.

In the device shown in Fig. 1, a hopper 10 is provided for feeding a dry mixture of a suitable hydraulic cementitious material, such as Portland cement, and a reenforcing fibrous material, such as asbestos, onto a continuously advancing conveyor 12. A picker roll 13 of a conventional type serves to brush off excess material and leaves the sheet or band 11, comprising the mixture of cementitious and fibrous material, emerging therefrom of substantially uniform thickness, as indicated in Fig. 3. The sheet at this stage is readily deformable. It passes between side guides (not shown) to true up the edges. The sheet is next subjected to the action of the rotary die 14 provided with a molding surface 17 which impresses the desired pattern of ornamental contours, suitably irregular corrugations, on the sheet and, at the same time, slightly compresses the material and makes it more dense below the depressions than elsewhere. Die 14, shown in detail in Fig. 2, is specially adapted for the production of shingles such as illustrated in Figs. 7 and 8, wherein the ornamental contours or surface irregularities are confined to the portion of the shingle exposed to view when laid in a finished structural assembly, such as a roof. The pattern illustrated imparts to a portion of the face of the shingle an irregular grooved surface simulating the weathered and antique effects obtained in old wooden shingles and timbers. Also, the shingle may be colored, by conventional means at some stage in the manufacture, with materials that impart a color resembling weathered wood to all of the shingle or, preferably, only to the surface of the shingle that is to be exposed in a structural assembly.

Die 14 and picker roll 13 are rotated by any usual means, such as belts 15 from pulley 16.

The sheet next passes under a water spray 21 of the usual type for applying sufficient water to the sheet to hydrate the cement, the water thus applied being quickly absorbed in the porous mass.

The sheet then passes under a vessel 22 containing a suitable filler material and provided with a hopper or sieve 23 for feeding the filler material 27 into the depressions in the sheet formed by die 14.

The filling material which is preferred at this time is granulated rubber. Thus, used, solid rubber, truck tires may be cut or granulated to a form suitable for use as the granular filler. I have used to advantage such granulated rubber having particles of such size that most, suitably all, of them pass through a 3-mesh screen but are retained on a 28-mesh screen, in a standard screening test. Thus, I have used granulated vulcanized rubber that shows no particles retained on a 3-mesh screen, 14 to 24 per cent by weight of particles retained on a 6-mesh screen, and 4 to 7 per cent through a 28-mesh screen, in a test in which the screens were vibrated.

The feed of the filler material from the hopper may be produced by vibrating the container 22 or by other conventional means. Apron 24 serves to level off the filler material in such a manner that it covers the corrugated surface, as illustrated in Fig. 5.

The sheet with the surface thus treated next passes under a compression roll 25 which partially compacts the sheet to the degree indicated in Fig. 6. Both compression roll 25 and die 14 may be arranged with their axes at a slight angle with respect to the plane of the conveyor 12, so that sheet 11 is thereby tapered in a transverse direction, the thick butt portion coinciding with the ornamental surface, as indicated in Fig. 8.

The sheet is then severed by crosswise cutting into segments, which are usually somewhat larger than the size desired for the finished shingle. The segments are stacked in piles with a flat metal plate between adjacent segments and subjected to further compression or densifying in a hydraulic press. During this pressing, the ornamental contours may be deformed slightly but not excessively; the finished sheet still shows pronounced elevations and depressions, as described later. The compacted segments are removed from the press and are permitted to stand until the cement is thoroughly hardened, the metal plates being removed after the cement has taken an initial set. These operations are not shown, since they are conventional in the manufacture of shingles of the rigid asbestos type.

The filler material is then removed from the hardened product by brushing, for example, or by other mechanical means not involving liquefaction or change of state. The segments thus treated are ordinarily somewhat wider than the width of two shingles and are finally divided and trimmed to size, to produce individual shingles such as illustrated in Figs. 7 and 8. The butt end edge 26 may be left untrimmed, of rough and uneven shape. Nail holes 28 are provided.

Another product and process to which the present invention is applicable as an improvement are described in U. S. Patent 1,513,620 to MacIldowie. According to MacIldowie, granules of rock salt, or other liquefiable material, are spread upon a plastic sheet of Portland cement, asbestos fibers, and water, for example, and impressed therein, the sheet hardened, and the granules removed from the surface by liquefaction, as by dissolving in a solvent.

In my improved process, the liquefiable material of MacIldowie is replaced by granular rubber or the like, with substantial improvement in the process as well as a change in the product.

The ease of substantial but not complete deformation of rubber under pressure makes possible the application of high pressure, say 14,000 pounds per square inch of the plastic sheet coated with such material, without embedding the granular rubber to an undesired depth in the said sheet. Under such pressure the rubber tends to flatten. When the pressure is released, the rubber, being resilient, resumes its original shape. In so doing, it loosens itself from the relatively wide, shallow pits formed during the compression and can be brushed therefrom. The readiness with which the brushing out of the rubber filler is accomplished is further facilitated by the ability of the rubber to be stretched or deformed by the brushing.

When non-resilient granules are used, on the other hand, either the granule is pushed relatively far into the plastic sheet, if the granule is hard, or the granule is crushed, if it is soft. Thus, the pits formed in a plastic sheet by granulated stone or rock salt may be undesirably deep; those formed by a wax, such as paraffin, may be very shallow and almost invisible.

Furthermore, granular rubber, after being brushed from a pressed sheet may be reused directly. A material removed by liquefaction, say by solution, is not directly reusable. In fact, recovery of such material for reuse is sometimes too inconvenient to be economically desirable. Thus, salt used as the granular material may be completely lost, the salt dissolved out by washing involving an unjustified expense of recovery, and being preferably replaced by new salt.

In addition, a water-soluble filler such as salt, if used, dissolves in the water in the sheet. First, this affects the setting of the cement in the sheet, particularly in the surface adjacent to the salt. Second, the presence of water-soluble material in the finished product, after the final washing, may cause an undesired amount of blooming or efflorescence, that is, migration of soluble material to the surface of the product.

Also, granular rubber may consist of very irregularly shaped particles, some of them more or less stringy, for example. This irregularity favors irregularity of pits formed in the surface of the plastic material pressed against the particles.

Since rubber is impermeable to water, the rubber does not become bonded to the plastic sheet by penetration of the aqueous composition of the sheet into the rubber.

Granulated cork may be used as the filler, to protect irregularities in a plastic sheet against excessive deformation during pressing or to produce pitting of an otherwise smooth surface. However, cork is more difficult to remove from the pressed sheet, possibly because of a lesser degree of resilience and a somewhat greater permeability to water than possessed by rubber. Sawdust, used as the filler, is more difficultly removable than the cork.

While the invention has been described with particular reference to the provision of ornamental contours or irregularities in structural units or shingles such as those known commercially as rigid asbestos shingles, the invention is applicable generally to the provision of ornamental contours in materials which are readily deformable at one stage of their manufacture and are subsequently hardened. While irregular corrugation has been described, it is to be understood that a regular configuration of surface of the unit may be produced, as by impressing a regularly corrugated surface upon a deformable material and proceeding otherwise as described above.

The term "plastic" is used herein as synonymous and co-extensive in meaning with the term "readily deformable" and does not imply that the material so characterized necessarily possesses a self-sustaining structure, since the preferred material for the application of our invention is a dry mixture of Portland cement and asbestos which, although readily deformable, is not sufficiently coherent to be self-sustaining.

Since the details that have been given are for the purpose of illustration and not restriction of the invention, it is intended that the invention should be limited only by the terms of the claims.

What I claim is:

1. A method of imparting a surface having ornamental contours to materials which are plastic or readily deformable in one stage of their manufacture and which are subsequently densified by application of pressure, comprising treating the material while in the readily deformable stage to impart the desired elevations and depressions forming the ornamental contours in the surface thereof, filling the depressions with a granular, resilient filling material, applying pressure to the surface of the plastic material thus treated, to impart the requisite degree of density and strength thereto and to impress the filling material in part into the surface of the sheet, and thereafter removing the filling material from the depressions, to expose pits formed by impressing and then removing the filling material and also the ornamental contours.

2. A method of imparting a surface having ornamental contours to sheet material which is readily deformable or plastic at one stage of its manufacture which comprises passing an elongated sheet or strip of the material while in its plastic state into contact with a molding surface adapted to mold depressions and elevations, forming the desired ornamental contours in the surface of the sheet, filling the depressions with a granular, water-insoluble, resilient filling material, applying pressure to the surface of the plastic sheet thus treated to densify and strengthen the sheet, and thereafter removing the filling material to expose the ornamental contours.

3. A method of manufacturing flat shapes such as sheets, slabs, and the like, having ornamental contours on the surface thereof and adapted for use as shingles and other purposes, from hydraulic cementitious material, which comprises passing an elongated strip or sheet of the cementitious material into contact with a molding surface adapted to mold depressions and elevations, forming the desired ornamental contours in the surface of the sheet, filling the depressions with a granular, resilient filling material, subjecting the surface thus treated to pressure to densify the sheet, allowing the densified sheet to harden, and thereafter removing the filling material to expose the ornamental contours.

4. A method of manufacturing flat shapes such as sheets, slabs, and the like, having ornamental contours on the surface thereof and adapted for use as shingles and other purposes, from hydraulic cementitious material and a reenforcing fibrous material, which comprises passing an elongated strip or sheet of the cementitious material and the fibrous material into contact with a molding surface adapted to partially compress the sheet and simultaneously mold depressions and elevations forming the desired ornamental contours in the surface of the sheet, filling the depressions with a granular, resilient filling material, subjecting the surface thus treated to pressure to densify the sheet, allowing the densified sheet to harden, and thereafter removing the filling material to expose the ornamental contours.

5. A method of manufacturing flat shapes such as sheets, slabs, and the like, having ornamental contours on the surface thereof and adapted for use as shingles and other purposes, from hydraulic cementitious material, which comprises passing an elongated strip or sheet of dry, finely divided cementitious material into contact with a molding surface adapted to mold depressions and elevations forming the desired ornamental contours in the surface of the sheet, spraying sufficient water upon the surface of the sheet to hydrate the cementitious material, filling the depressions with a granular, resilient filling material, subjecting the surface thus treated to pressure to densify the sheet, allowing the densified sheet to harden, and thereafter removing the filling material to expose the ornamental contours.

6. A method of manufacturing rigid shingles which comprises passing a layer consisting chiefly of a mixture of Portland cement and fibrous material into contact with a molding surface adapted to mold depressions and elevations forming the desired ornamental contours in the surface of the layer, filling the depressions with a granular, resilient filling material, subjecting the surface thus treated to pressure, cutting the compacted material into shingles and removing the filling material.

7. A method of manufacturing rigid shingles which comprises passing a layer, consisting chiefly of a mixture of approximately 1.9 parts by weight of Portland cement and 1 part of asbestos fibers and admixed coloring material to establish the desired color, into contact with a molding surface adapted to mold depressions and elevations forming the desired ornamental contours in the surface of the layer, filling the depressions with a granular, resilient filling material, subjecting the surface thus treated to pressure, cutting the compacted material into shingles, and removing the filling material.

8. In the process of manufacture of a shingle from a mixture consisting chiefly of Portland cement and asbestos fibers, the improvement comprising forming the mixture into a sheet, irregularly corrugating a portion of a face of the sheet, covering the corrugated face with water-insoluble, granular filling material, compressing and hardening the covered sheet, and then removing the filling material from the sheet without change of state, whereby there is produced a rigid shingle provided with a face of modified light-reflecting properties.

9. In the process of manufacture of a shingle from a mixture consisting chiefly of Portland cement and asbestos fibers, the improvement comprising forming the mixture into a sheet, corrugating a portion of a face of the sheet, covering the corrugated face with water-insoluble, granular, water-impermeable filling material, compressing and hardening the covered sheet, and then removing the filling material from the sheet, whereby there is produced a rigid shingle provided with a face of modified light-reflecting properties.

10. In the process of manufacture of a shingle from a mixture consisting chiefly of Portland cement and asbestos fibers, the improvement comprising forming the mixture into a sheet, corrugating a portion of a face of the sheet, covering the corrugated face with water-insoluble, granular, water-impermeable, resilient filling material, compressing and hardening the covered sheet, and then removing the filling material from the sheet, whereby there is produced a rigid shingle provided with a face of modified light-reflecting properties.

11. In the process of manufacture of a shingle from a mixture consisting chiefly of Portland cement and asbestos fibers, the improvement comprising forming the mixture into a sheet, corrugating a portion of a face of the sheet, covering the corrugated face with granular rubber filling material, compressing and hardening the covered sheet, and then removing the filling material from the sheet, whereby there is produced a rigid shingle provided with a face of modified light-reflecting properties.

12. In the process of manufacture of a shingle from a mixture consisting chiefly of Portland cement and asbestos fibers, the improvement comprising forming the mixture into a sheet, corrugating a portion of a face of the sheet, covering the corrugated face with granular cork filling material, compressing and hardening the covered sheet, and then removing the filling material from the sheet, whereby there is produced a rigid shingle provided with a face of modified light-reflecting properties.

13. In the process of manufacture of a shingle from a mixture consisting chiefly of Portland cement and asbestos fibers, the improvement comprising forming the mixture into a sheet, irregularly corrugating a portion of a face of the sheet, covering the corrugated face with water-insoluble, granular filling material of irregularly shaped particles, compressing and hardening the covered sheet, and then removing the filling material from the sheet, whereby there is produced a rigid shingle provided with a face of modified light-reflecting properties.

14. In the process of manufacture of a shingle from a mixture consisting chiefly of Portland cement and asbestos fibers, the improvement comprising forming the mixture into a sheet, irregularly corrugating a portion of a face of the sheet, covering the corrugated face with water-insoluble, granular resilient filling material of size of particles sufficiently small to pass a 3-mesh screen, compressing and hardening the covered sheet, and then removing the filling material from the sheet, whereby there is produced a rigid shingle provided with a face of modified light-reflecting properties.

15. In the manufacture of a shingle consisting chiefly of a mixture of Portland cement and asbestos fibers and adapted for use in a structural assembly, the method which comprises making the said mixture into a sheet, adding a coloring material to the portion of the sheet that is to constitute the exposed face of the shingle in a structural assembly, impressing irregular corrugations upon the said portion of the sheet, covering the corrugated sheet with granular rubber filling material or the like to protect the corrugations from excessive deformation, compressing and hardening the covered article, and then removing the filling material, whereby a rigid shingle resembling weathered wood in appearance is produced.

16. In the manufacture of sheets from a mixture that is deformable at one stage of the manufacture, the method which comprises forming a deformable sheet, spreading thereon granular, resilient material, compressing and hardening the sheet in contact with the resilient material, and then removing the said resilient material from the hardened sheet.

17. In the manufacture of sheets from a mixture that is deformable at one stage of the manufacture, the method which comprises forming a deformable sheet, spreading thereon granular rubber, compressing and hardening the sheet in contact with the rubber, and then removing the rubber from the hardened sheet without change of state.

WALTER McQUADE.